US007506341B2

(12) United States Patent
Bent et al.

(10) Patent No.: US 7,506,341 B2
(45) Date of Patent: Mar. 17, 2009

(54) SYSTEM AND METHOD FOR CONTROLLING USER INTERFACE PROPERTIES WITH DATA

(75) Inventors: Samuel W. Bent, Bellevue, WA (US); Namita Gupta, Kirkland, WA (US); David J. Jenni, Sammamish, WA (US); Alexander I. Hopmann, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1206 days.

(21) Appl. No.: 10/440,081

(22) Filed: May 17, 2003

(65) Prior Publication Data

US 2004/0227776 A1  Nov. 18, 2004

(51) Int. Cl.
*G06F 3/00* (2006.01)
*G06F 9/44* (2006.01)
*G06F 9/46* (2006.01)
*G06F 13/00* (2006.01)

(52) U.S. Cl. .................. 719/315; 719/318; 715/762; 717/108; 717/116

(58) Field of Classification Search .......... 717/106–123; 719/310–320, 328–332; 715/760–764
See application file for complete search history.

(56) References Cited

U.S. PATENT DOCUMENTS

| | | | | |
|---|---|---|---|---|
| 6,023,271 A | * | 2/2000 | Quaeler-Bock et al. ...... 715/866 |
| 6,167,455 A | * | 12/2000 | Friedman et al. .......... 719/320 |
| 6,330,006 B1 | | 12/2001 | Goodisman .............. 345/762 |
| 6,378,004 B1 | | 4/2002 | Galloway et al. .......... 709/321 |
| 6,429,880 B2 | * | 8/2002 | Marcos et al. ............ 715/744 |
| 6,438,618 B1 | | 8/2002 | Lortz et al. ............. 709/318 |
| 6,738,804 B1 | * | 5/2004 | Lo ..................... 709/219 |
| 7,194,743 B2 | * | 3/2007 | Hayton et al. ............ 719/315 |
| 2001/0042140 A1 | * | 11/2001 | Calder et al. ............ 709/328 |
| 2002/0026447 A1 | * | 2/2002 | Matsutsuka et al. ....... 707/103 Y |
| 2003/0035003 A1 | | 2/2003 | Marcos et al. ........... 345/760 |
| 2003/0074634 A1 | * | 4/2003 | Emmelmann ............. 715/513 |

OTHER PUBLICATIONS

Sweet et al.; "*Fundamentals of KDE Application Programming*";. Oct. 2000; 36 pgs.
Gamma et al.; "*Design Pattern*"; Feb. 20, 2003; 3 pgs.
European Search Report dated Sep. 20, 2007 cited in European Application No. 03734067.6.

* cited by examiner

*Primary Examiner*—Meng-Ai An
*Assistant Examiner*—Diem K Cao
(74) *Attorney, Agent, or Firm*—Merchant & Gould, P.C.

(57) ABSTRACT

Described is a system and method for controlling user interface (UI) properties with data. An application is separated into independent parts, a logic portion and a UI portion. The logic portion manipulates data values within the application. The UI portion is responsible for displaying UI properties. A binding specification describes a relationship between the UI property and the data value. The binding specification is used by system level code to determine the manner in which it is notified when the data value undergoes a change and the manner in which it directs the UI portion to reflect the change in the UI property. The binding specification identifies a source data item, a path to the data value in the source data item, a target UI element, and the UI property on the target UI element. The binding may be specified using code or markup language.

35 Claims, 4 Drawing Sheets

SYSTEM AND METHOD FOR CONTROLLING USER INTERFACE PROPERTIES WITH DATA

BACKGROUND OF THE INVENTION

The manner in which information is presented to users affects the user's ability to understand and comprehend the information. On computer displays, it has become a standard practice to add emphasis to information by using color, font styles, and the like. This emphasis allows users to more readily grasp the importance of the information. The code handling the presentation of the information (user interface) and the code performing the application logic on the information are typically closely coupled. For example, the logic assigns user interface properties (e.g., color, font, position, size) directly with data. Thus, when there is a change to the user interface, the logic must also change. For example, in the case of a text box, the user interface code listens to determine whether text has changed, upon a change, the user interface code validates the changed text and then displays the changed text. This tightly coupled nature of the user-interface and the logic results in very fragile code. Maintaining this fragile code is very costly and time consuming.

SUMMARY OF THE INVENTION

The present invention is directed at a system and method for controlling the user interface with data. The invention decouples the user interface and the data, along with its application logic, by providing a mechanism for associating data to the user interface. The invention enables user interface designers and application authors who write the application logic to work independently. Neither the designers nor the authors need to understand the other's code or will impact the other's code development. This invention also allows changes to the user interface to be done quite easily. For example, when new and more user-appealing user interface platforms become available or when the user interface designer wishes to change the look of the application, the designer does not need to change the application logic. In addition, the mechanism for associating data to the user interface is dynamic. This allows any changes in the data to be automatically reflected in the presentation. In addition, any input from a user via the user interface can be automatically update the data. Because the present invention allows association of not only data display aspects of the user interface (e.g., text), but also visual aspects (e.g., background, font size, and the like), descriptive, visually enhancing and flexible presentation of data can be provided. For example, negative numbers may be displayed in red or an arrow may appear pointing upwards when stock prices are increasing.

Thus, in accordance with the present invention, an application is separated into independent parts, a logic portion and a UI portion. The logic portion manipulates data values within the application. The UI portion is responsible for the presentation of the data. A binding specification describes a relationship between the UI property and the data value. The binding specification is used by system level code to determine the manner in which it is notified when the data value undergoes a change and the manner in which it directs the UI portion to reflect the change in the UI property. The binding specification identifies a source data item, a path to the data value in the source data item, a target UI element, and the UI property on the target UI element. The binding may be specified using code or markup language.

DETAILED DESCRIPTION OF THE PREFERRED EMBODIMENT

The present invention is directed at a system and method for controlling the user interface with data. The invention decouples the user interface and the application logic by providing a mechanism for associating the data with the user interface. As will be described in detail below, this decoupling of the user interface and the data, along with its associated logic, allows different groups of developers to work independently on both the user interface and the logic without impacting the code development of the other group. In addition, described in detail below, the present invention provides a system and mechanism for automatically transferring values from data sources to the user interface and vice versa. Throughout the following discussion, the term "databinding" refers to the process of associating data values with UI properties, transferring and updating the data values, and the like.

Illustrative Computing Environment

Figure 1:
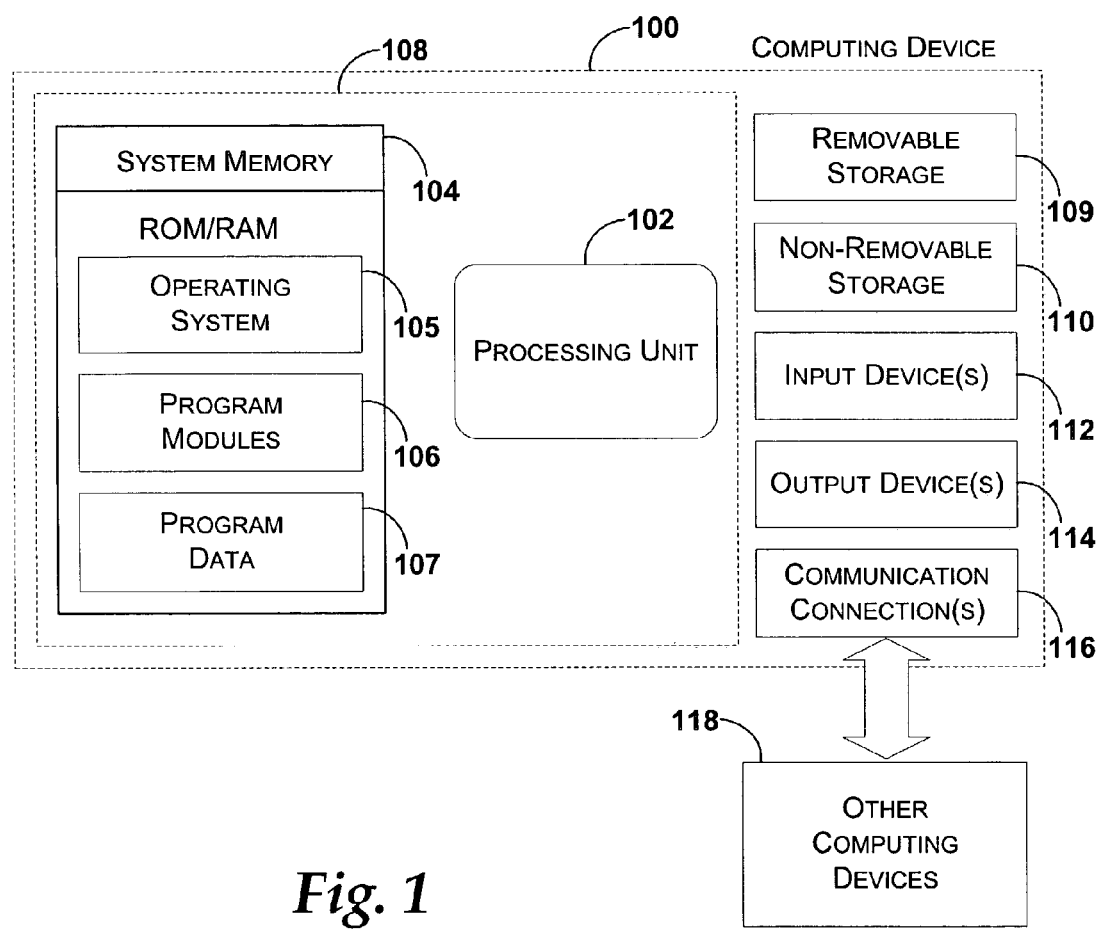
FIG. 1 illustrates an exemplary computing device that may be used in illustrative implementations of the present invention.

FIG. 1 illustrates an exemplary computing device that may be used in illustrative implementations of the present invention. With reference to FIG. 1, in a very basic configuration, computing device 100 typically includes at least one processing unit 102 and system memory 104. Depending on the exact configuration and type of computing device 100, system memory 104 may be volatile (such as RAM), non-volatile (such as ROM, flash memory, etc.) or some combination of the two. System memory 104 typically includes an operating system 105, one or more program modules 106, and may include program data 107. Examples of program modules 106 include a browser application, a finance management application, a word processor, and the like. This basic configuration is illustrated in FIG. 1 by those components within dashed line 108

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device 100 to communicate with other computing devices 118, such as over a network. Communication connections 116 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Illustrative Implementation

Figure 2:
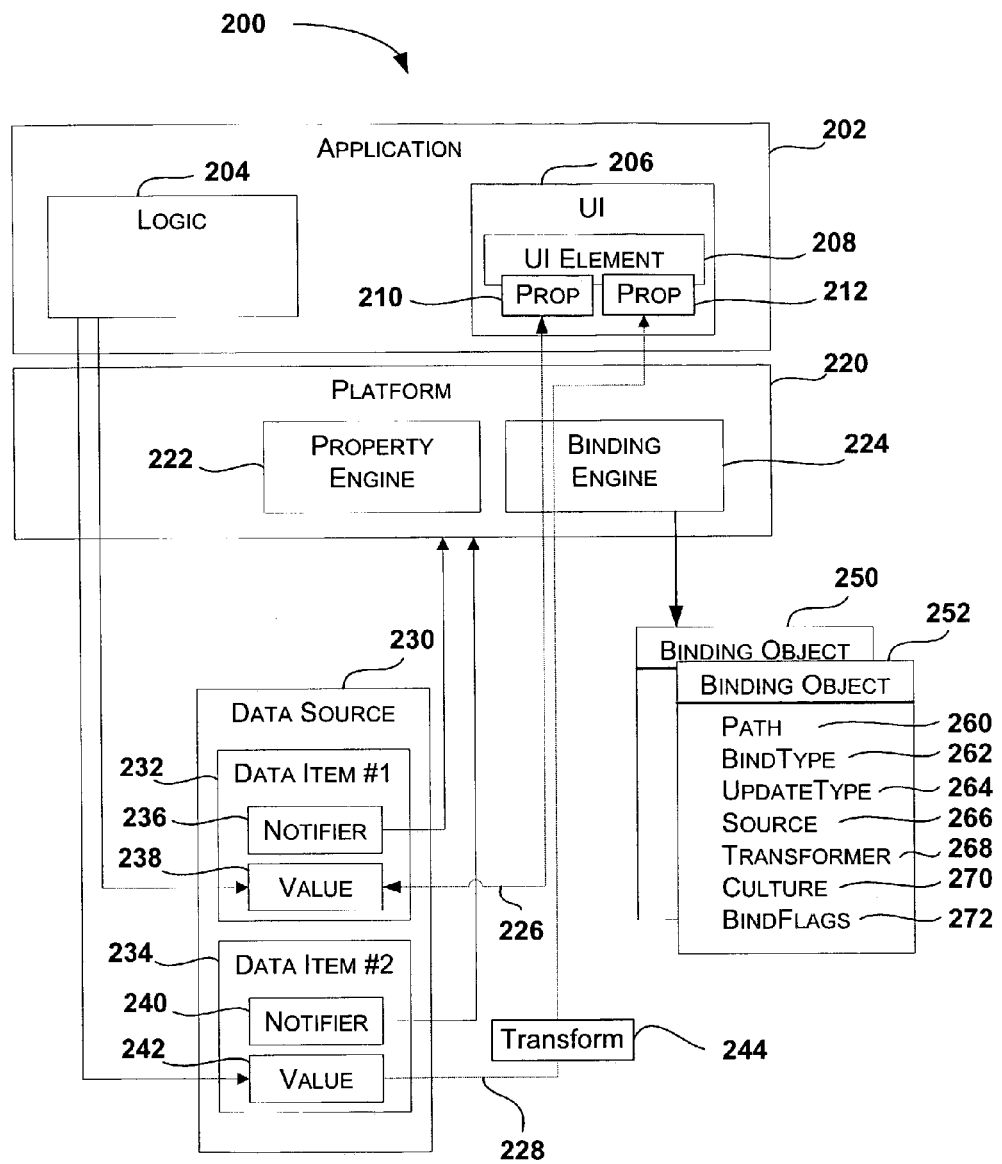
FIG. 2 is a functional block diagram illustrating one embodiment for controlling user interface properties with data in accordance with the present invention.

FIG. 2 is a functional block diagram illustrating one embodiment of a system 200 for controlling user interface properties with data in accordance with the present invention. The system 200 includes an application 202, a platform 220, and a data source 230. Application 202 may be one of applications 106 on computing device 100 shown in FIG. 1. The application 202 includes code (hereinafter referred to as logic 204) for manipulating a data value (e.g., source data value 238). In general, the logic 204 performs validation on data values and updates the data values. Data value (e.g., data value 238) represents the content of a property (i.e., a data source property) of a data item (e.g., data item 232). The data item 232 is located within a data source (e.g., data source 230). Each data source 230 may include several data items, each data item has one or more properties, in which the source data value is stored. Logic 203 may manipulate data values from multiple data sources. The data sources may include an XML document, an object, a dataset, and the like. As will be described in greater detail below, each property of the data item may be used to control the user interface (UI).

The application 202 also includes code (hereinafter referred to as user interface 206) for presenting information. The user interface 206 includes several user interface elements (e.g., user interface element 208). Each user interface element 208 includes one or more properties (e.g., UI properties 210 and 212), such as for displayed text, color, font, position, size, and the like. Then, as described in detail later, these UI properties 210 and 212 are associated with one or more of the data values 238 and 242 in accordance with the present invention. In general, the association occurs via a binding engine 224 within the platform 220. The platform 220 represents a system layer of services, such as an operating system, a virtual engine, and the like. The platform 220 also includes a property engine 222 that is responsible for maintaining hierarchical information pertaining to the data values 234 and 242 and for updating the associated properties with data values. Even though binding engine 224 and property engine 222 are shown as separate components, one skilled in the art will appreciate that the functionality provided by each may be included within one component without departing from the present invention.

The association (i.e, bindings) of the data values 238 and 242 to their UI properties 210 and 212 is represented in FIG. 2 by dashed lines from the data value to the UI property (hereinafter referred to as bindings 226 and 228). During the following discussion, the term "data value" may be used interchangeably with the term "source data value". Similarly, the term UI property may be used interchangeably with the term "target property". These bindings 226 and 228 allow dynamic properties (i.e., target properties) to be automatically set from data values (i.e., source data values), such as from properties of arbitrary objects. These bindings may be dynamic so that the bound target property automatically updates to reflect changes in the source data value.

In order to provide this automatic updating capability, the present invention further provides a notification mechanism (e.g., represented in FIG. 2 by notifiers 236 and 240 and arrows from the notifiers to platform 220). Each data item 232 and 234 has a corresponding notifier 236 and 240, respectively. The notification mechanism is responsible for informing the system that the source data value has changed and that the data value can be propagated to the target property (i.e., UI property).

Figure 4:
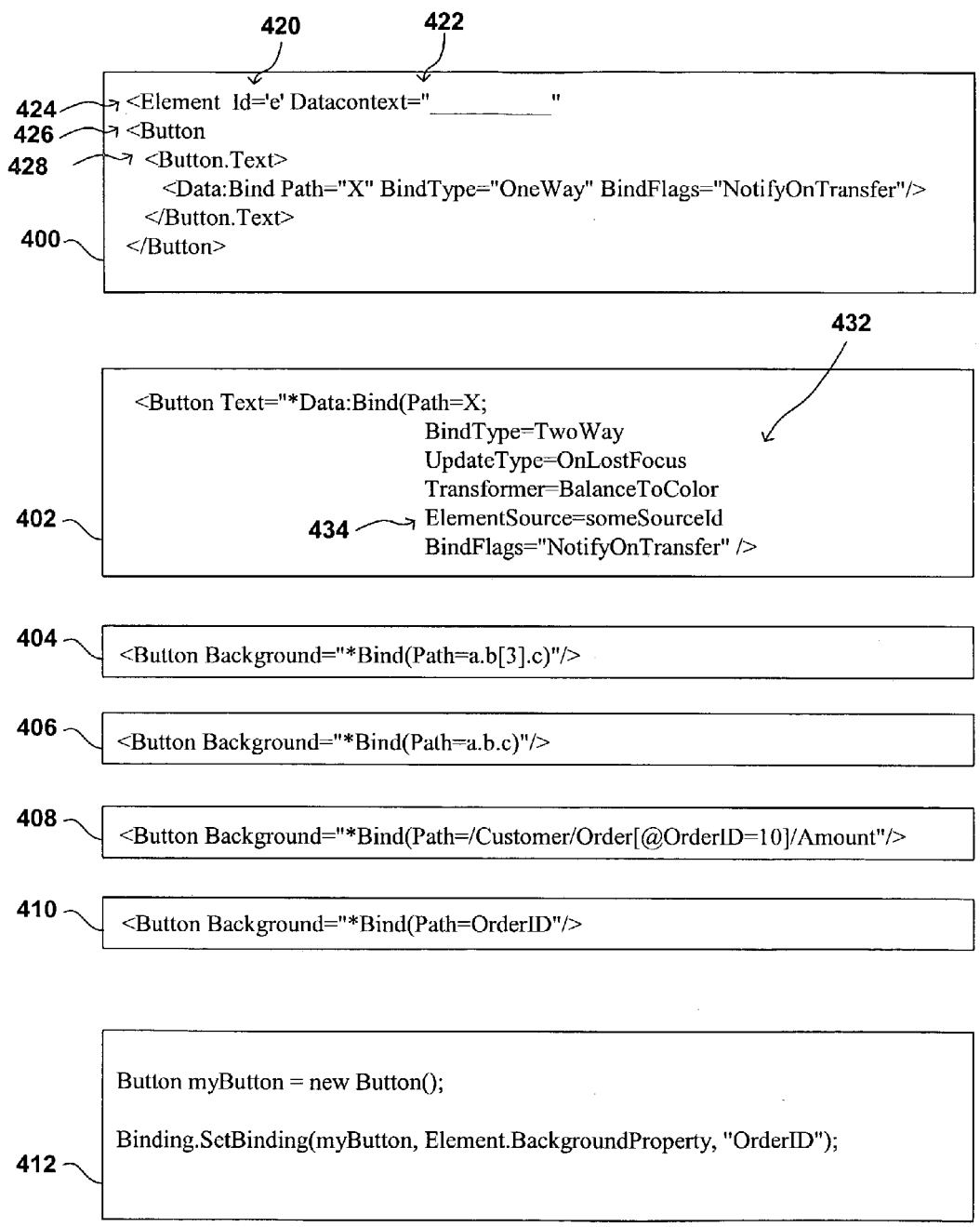
FIG. 4 illustrates several exemplary syntaxes for associating the user interface properties with the data in accordance with the present invention.

When a binding 226 and 228 is created, such as through markup, code, and the like, the binding engine 224 creates a binding object (e.g., binding objects 250 and 252) associated with the binding. For example, binding object 252 may represent binding 228 within the binding engine 224. Each binding object includes several properties (e.g., binding properties 260-272). Each of these binding properties 260-272 may be set programmatically. The following discussion describes each of these properties and FIG. 4 illustrates exemplary code for activating a binding that specifies some of these properties.

One of the binding properties (hereinafter referred to as path 260) identifies the manner in which to locate the source data value (via the source object). The path 260 may refer to a property, sub-property or indexer on the source object, a column in ADO (ActiveX Data Objects), an XPath on XML, and the like. Alternatively, the path may refer to a reflection or ADO path.

Another one of the binding properties (hereinafter referred to as bindtype 262 defines a type for the binding 226 and 228. In one embodiment, the bindtype includes oneWay, twoWay, and oneTime. As an illustration, binding 226 represents a twoWay binding and binding 228 represent a oneWay binding. One of these binding types is set as a default. In one embodiment, twoWay binding is set as the default binding type.

When the bindtype 262 is specified as oneWay, this signals the binding engine 224 to update the target property (e.g., UI property 210) every time a change occurs in the associated source data value. OneWay bindtype is useful for binding a data value to a non-editable UI property, such as text color, text background, and the like. Using oneWay bindtype avoids the overhead of a twoWay bindtype, described below. This decrease in overhead is most noticeable when listening to changes in UI properties regarding layout content. For these UI properties, the dynamic properties of each of the children of the UI property must be listened to for changes to the UI property. OneWay bindtype may also be useful when changes in the UI property are just for showing other presentation detail.

When the bindtype 262 is specified as twoWay, this signals the binding engine 224 to update the target property every time a change occurs in the source data value and vice versa. TwoWay binding is especially helpful when binding data to an edit box where any changes made by the user in the edit box need to be propagated to the source data value. Another scenario for twoWay binding is when another application is responsible for the source data field and those changes are reflected in an edit box.

When the bindtype 262 is specified as oneTime, this signals the binding engine 224 to initialize the target property once and then leave it untouched, even if the associated source data value is changed. The oneTime bindtype is useful when some target property needs to be initialized with some value from a source field and the data context is not known in advance. In addition, oneTime bindtype is useful for read-only use of unchanging source data values. If the data source does not support the property notification mechanism of the present invention (e.g., IPropertyChange interface), the target property that is specified as oneWay will be updated similarly as if the binding specified oneTime as the bindtype.

Another one of the binding properties (hereinafter referred to as updatetype 264) defines a type of update for the case in which bindtype 262 specifies twoWay. Typically, twoWay bindings listen for changes in the target property and propagate those changes back to the source data value. This process is referred to as updating the source. Normally, it is desirable to update whenever the target property changes. However, in certain situations, updating after every keystroke wastes cycles and denies the user the opportunity for correcting typing errors and the like. Updatetype 264 allows the user to specify when the updates should occur. In one embodiment, updatetype 264 may specify Immediate, OnLostFocus, and Explicit. Specifying Immediate will signal the binding engine to update the source data value after every change to the target property. Specifying OnLostFocus will signal the binding engine to update the source data value after the target element has lost keyboard focus. Specifying Explicit will signal the binding engine to update the source data value only when the application explicitly requests an update. Typically, this explicit request is performed via a method. Even though this method may be called for any setting of updatetype 264, the method is useful when the updatetype is set to Explicit. One exemplary method is shown below:

Binding.GetBinding(myElement, myProperty).Update( );.

Another one of the binding properties (hereinafter referred to as source 266) identifies the source data item for the binding. Briefly, illustrated in FIG. 4 and described in conjunction therewith, the source 266 may be set programmatically or with markup. Programmatically, the developer provides an objectref to the object that the binding should use as the source data item. Briefly, described in detail in conjunction with FIG. 4, in markup, there are various methods for setting the source property.

Another one of the binding properties (hereinafter referred to as transformer 268) accepts a class reference. The class reference may be specified using <Namespace>. <Class>, <Assembly>. The class reference that is specified is invoked by the binding engine 224 to transform the source data value into a format accepted by the target property. A method within the class reference invokes this transformation, represented as transform 244 in FIG. 2. The class reference may also specify an inverse transform (not shown) for transforming the target property to a format accepted by the source data value. The transform 244 may supply UI semantics or be a custom type converter.

Another one of the binding properties (hereinafter referred to as culture 270) defines the manner in which the source data value should be handled before/after transforming the source data value. Culture 270 operates in conjunction with transformer 268 to allow developers to specify rules for transforming source data values. For example, the culture may specify a specific format for numbers, dates, and the like. In one embodiment, the culture 270 accepts a value of a type CultureInfo. The developer has the option of using the rules specified by the culture 270 when implementing the transform.

Another one of the binding properties (hereinafter referred to as bindflags 272) provides a mechanism for receiving events signaling the transfer of data. Because the above described method for data binding is asynchronous, the bindflags 272 allow a developer to know when the target has been updated with the new value. In order to use this mechanism, the bindflags 272 is set to "NotifyOnTransfer". A handler is then registered for the event using any customary ways. One exemplary use for this mechanism is as follows:

```
Public static void main( )
{
    //Add a handler
    elem.AddAttachedHandler(Binding.DataTranferEvent,
            new DataTranferEventHandler(OnDataTransfer),
            RoutedEventArgs.EventStage.Direct);
    //Event handler
    private static void OnDataTransfer(Element e,
    DataTransferEventArgs args)
    {
        DynamicProperty DP=args.DP;
        v=e.GetValue(DP);
        DoSomething(v);
    }
    source.field="new value";
}.
```

As shown in the above example code, once the OnDataTransfer event has been triggered, the developer knows that the dynamic property has been updated. Thus, the developer may then use the target value for further processing.

Figure 3:
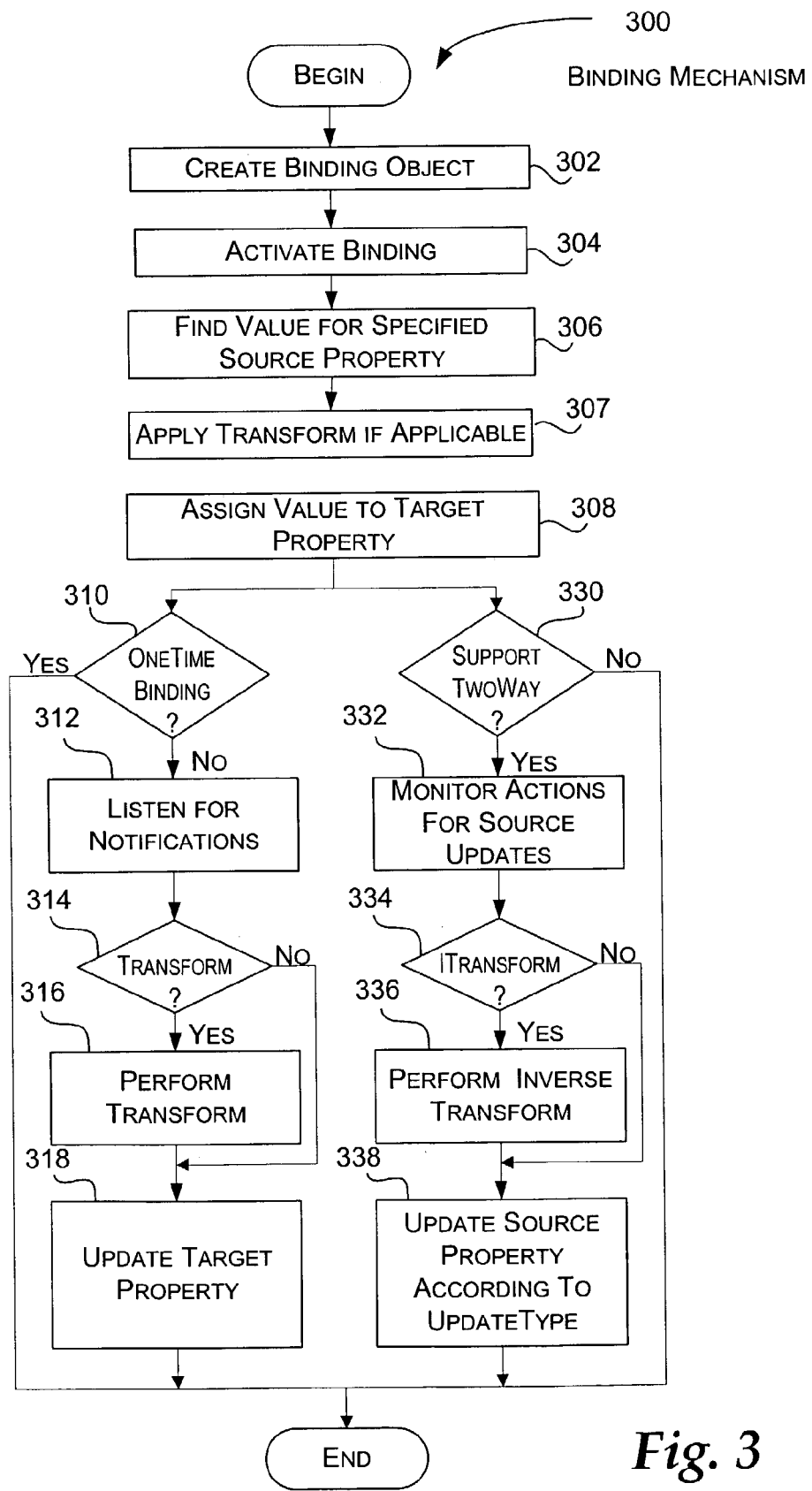
FIG. 3 is a logical flow diagram illustrating a process for binding a user interface property with a data value in accordance with one embodiment of the present invention.

FIG. 3 is a logical flow diagram illustrating a binding mechanism in accordance with one embodiment of the present invention. In overview, the binding mechanism performs actions to set-up the binding (blocks 302-306) and then performs actions (blocks 310-338) related to changes in the target property or source data value as specified in the binding. Processing continues at block 302.

At block 302, a binding object is created based on the arguments specified during the creation. Briefly, each property (i.e., properties 260-272 shown in FIG. 2) for the binding object 252 may be specified as an argument during the creation. The binding may be created through markup, programmatically, and the like. FIG. 4 illustrates exemplary syntaxes for creating a binding and specifying the properties 260-272. Each manner of creation specifies a source data item, a path to the data value in the source data item, a target UI element, and a target dynamic property on the UI element. While not shown in the present flow diagram, the properties of the binding object may also be modified dynamically during runtime, such as through the use of application programming interfaces (APIs). Processing proceeds to block 306.

At block 304, the binding is activated. In one embodiment, the binding may be activated automatically once the binding engine notices that there is sufficient context for the binding, such as having the source object exist, the target element ready to display, and the like. The binding engine is responsible for recognizing activation of the binding. Processing continues at block 304.

At block 306, a value for the specified source property is found. In one embodiment, reflection is used to find the value. Reflection is a general mechanism that allows a caller to obtain information about a requested object. The information includes objects that are supported, public properties, and the like. In another embodiment, when data item is a collection, the binding engine performs a number of heuristics to determine whether the to use the current record or the data object (collection) itself. A first heuristics is applied when the binding refers to a property or indexer. In this situation, the corresponding property or indexer on the collection object is used if such a property or indexer exists. Alternatively, the current record of the collection is used as the data item. Another heuristic is applied when no property or indexer exists. In this situation, the collection object is used for the target property as long as the collection object is valid. Otherwise, the current record is used. Before continuing to block 308, a transform is applied to the value if the binding specifies a transform (block 307). The application of a transform is described in detail in conjunction with block 316 below. Processing continues at block 308.

At block 308, the value that was found is assigned to the target property. In one embodiment, a property engine that is responsible for maintaining the hierarchy of the properties may assign the value. In another embodiment, a transform specified during creation of the binding may be invoked to transform the value before assigning the value to the target property. In a further refinement, the property engine may mark the property as having a new value. Once blocks 302-308 have been performed, the binding engine is ready for updating target properties and source data values as needed. In general, the binding mechanism is asynchronous.

Therefore, from block 308, processing continues through two asynchronous paths. A first path (blocks 310-318) is associated with updating the target property and a second path (blocks 330-338) is associated with updating the source data value. Each of these paths is described below. First, the path responsible for updating the target property is discussed.

At decision block 310, the binding engine determines whether the binding associated with the source data value and the target property has specified the bindtype as oneTime. If the bindtype is oneTime, processing is complete for this binding and proceeds to the end. One skilled in the art will recognize, that if the bindtype is oneTime, the binding engine does not listen for source property change events. Thus, in actual practice, the logic within the binding engine does not necessarily perform a check as shown in block 310. In addition, if the data item does not implement IPropertyChange, processing is complete. If, however, the bindtype is not oneTime, processing continues at block 312.

At block 312, the binding engine listens for notifications associated with the bindings. Because databinding does not directly update the target with the source data value, the present invention implements a notification mechanism. Notification mechanisms, such as property change notifications and collection view "CurrentChanged" notifications and the like, are known in the art and need not be discussed at length here. Different actions cause a notification, such as a data value change, a page navigation, shutdown, change in record of interest in a data collection, and the like. Because the present invention triggers an update upon a change in the record of interest in a data collection, the present invention provides a convenient mechanism for further de-coupling the user interface and the logic. For example, in accordance with the present invention, the developer only needs to write code in the logic to specify how to change to the next record of interest in a data collection. Once the change occurs, the binding engine, in accordance with the present invention, will update the user interface according to the bindings already specified. As mentioned before, this de-coupling of the user interface and the logic provides a more robust and more easily maintained application than when the user interface and logic are intertwined.

The following code is one exemplary implementation for the notification mechanism. While the exemplary code written below is written in C#, those skilled in the art will appreciate that various languages and syntax may be used to implement the notification mechanism. For any such implementation, an interface is defined for use by each data item. Each data item inherits this interface in order to implement dynamic updating.

```
Public interface IPropertyChange
{
    event PropertyChangedEventHandler PropertyChanged;
}.
```

Next, an event handler and its arguments are defined.

```
public delegate void PropertyChangedEventHandler(object sender,
PropertyChangedEventArgs e);
    public class PropertyChangedEventArgs : EventArgs
    {
        public virtual string PropertyName { get; }
    }.
```

The class PropertyChangedEventArgs includes one read-only property named PropertyName having a type string. The PropertyName property contains a name for the property which has changed. Each source data item then implements this interface by calling the PropertyChanged delegate whenever one of its properties has changed. The following is an illustrative example for implementing a source object (e.g., data item 232) in accordance with the embodiment for the notification mechanism.

```
public class myClass : IPropertyChange
{
    private string foo = "Hello World";
    public string Foo
    {
        get { return foo; }
        set { if(foo != value)
        {
            foo = value;
            NotifyPropertyChanged("foo");
        }
    }
    public event PropertyChangedEventHandler Property Changed;
    private void NotifyPropertyChanged(string propName)
    {
        PropertyChanged(this, new
            PropertyChangedEventArgs(propName));
    }
}.
```

As shown above in the exemplary code, the 'set' method for the 'foo' property determines whether a new value is different than the old value. If the values differ, the handler is called. Reflection is performed to get the PropertyInfo. In a further refinement, the binding engine may cache the type of the property once it is obtained through reflection. Thus, reflection is performed once, and not each time a notification is received for the property. In another refinement, an empty string may be passed in the arguments to signal that all bindings to each of the data item's data values should be updated. This may occur when the source object is not certain about which properties have changed and would like each binding updated. Once the binding engine receives a notification that the data source value has changed, processing continues at decision block 314.

At decision block 314, a determination is made whether the binding associated with the source data value that changed specified a transform for the binding. If the binding does not specify a transform, processing continues at block 318. However, if the binding does specify a transform, processing continues at block 316.

At block 316, the transform that is specified in the binding is performed. In one embodiment, transformer 268 is an object as described below:

```
Public interface IDataTransformer
{
    Public object Transform(object o, DynamicProperty dp,
        CultureInfo c) {;}
}.
```

For the above interface, o denotes the source value, dp denotes the target dynamic property, and c denotes the culture to use during the transformation. The Transform( ) method transforms the source value o into an object suitable for assignment to a dynamic property of type dp. The Transform( ) method is called when propagating a data value from the source of a binding to the target property. If the Transform( ) method returns a value of null, the binding engine is signaled to stop propagating values.

The transformer may also be used for controlling other UI properties, such as width, height, font, positioning (x,y), and the like based on the associated source data value specified in the binding. Transformers provide the ability to perform logic on the data value in order to show the data in several ways. In a further refinement, a culture may be applied during the transform as specified in the binding. Processing continues at block 318.

At block 318, the target property is updated. In one embodiment, the property engine assigns the value to the target property. In addition, the target property may be marked as having a new value. Processing may then continue to block 312 and listen for the next property change notification associated with the binding. Once the application ends or the binding is otherwise terminated, processing proceeds to the end.

As mentioned above, from block 308, processing may continue through a second path. Thus, from block 308, processing continues at decision block 330. As mentioned above regarding decision block 310, the logic within the binding engine may not necessarily perform a check of the bindtype during decision block 310, but rather, because the binding engine was not told to listen for notifications when the binding was created, the process does not flow through the second path However, for clarity in describing the flow, a decision block reflecting the bindtype is shown. Therefore, at decision block 330, a determination is made whether the binding specified twoWay as the bindtype. As discussed earlier, twoWay allows changes in the target property to be propagated to the source data value. If the binding does not specify twoWay as the bindtype, processing proceeds to the end. However, if the binding does specify twoWay as the bindtype, processing continues at block 332.

At block 332, the binding engine will recognize certain actions that trigger an update to the source data value. Once a trigger occurs, processing continues at decision block 334.

At decision block 334, a determination is made whether the binding specifies an inverse transform for the binding. If the binding does not specify an inverse transform, processing continues at block 338. However, if the binding does specify an inverse transform, processing continues at block 336.

At block 336, the inverse transform is applied to the source property. In one embodiment, the inverse transformer is an object as described below:

```
Public interface IDataTransformer
{
    Public object InverseTransform(object o, PropertyInfo pinfo,
        CultureInfo c) {;}
}.
```

For the above interface, o denotes the source value, c denotes the culture to use during the transformation, and pinfo denotes the PropertyInfo of the target property. The InverseTransform( ) method transforms the source value o into an object suitable for assignment to a property of type info. This method is called when propagating a value from the target of a binding to the source. If the InverseTransform( ) method returns a value of null, the binding engine does not propagate a value. Once the InverseTransform is performed, processing continues at block 338.

At block 338, the source property is updated according to the udpatetype. As described above, the updatetype may be immediate, on loss of focus, explicit, and others. Once the source property is updated, processing proceeds to the end.

FIG. 4 illustrates several exemplary means for creating a binding. Creation means 400-410 creates the binding through markup. Creation means 410 creates the binding through code. The illustrative means shown in FIG. 4 are not exhaustive. Other means (syntax) may be used without departing from the scope of the present invention.

Creation means 400 includes a DataContext name/value pair (hereinafter referred to as DataContext 422) and Id name/value pair (hereinafter referred to as Id 420) for an element 424. Because creation means 400 also includes DataContext 422, Id 420 is unnecessary. Id 420 is needed when it is desirable to refer to an explicit source, such as using ElementSource in markup or an IdObjectReg within code. Both of these uses are described below. DataContext 422 is a dynamic property defined on an element (e.g., element 424). The value associated with DataContext 422 represents the default source data item and is an inheritable property. The binding engine queries DataContext 422 and utilizes DataContext 422 when creating a binding for element 424 and descendent elements (e.g., Button element 426). The binding engine also listens for changes to DataContext 422, which triggers an update accordingly. Thus, while not required, DataContext 422 provides a convenient mechanism for establishing scope for all properties bound to a common data item. Descendant elements may have their own DataContext, which will take precedence over the DataContext 422 of the parent element. A binding may override DataContext 422 by supplying a non-null Source, described below in conjunction with creation means 402.

Button element 426 is illustrated with a target property (e.g., Button.Text 428). In accordance with the present invention, upon encountering "Data:Bind", the binding engine recognizes that a binding is being specified. Name/value pairs that follow, set the binding properties 260-272 as specified in FIG. 2. One skilled in the art will appreciate that the terms "Data:Bind" to signal a binding is an arbitrary term and any number of terms may have been used without departing from the present invention. Creation means 400 represents a verbose markup format.

Creation means 402 represents a compact markup format. The UI property (e.g., Button Text) is represented in a more compact fashion. Again, "Data:Bind" is used as a signal to the binding engine that what follows is a binding. Also, the name/value pairs following Data:Bind correspond to the desired properties 260-272 described earlier for the binding object 250 in FIG. 2. For example, ElementSource name/value pair (hereinafter referred to as ElementSource 434) corresponds to source 266.

In markup, there are two methods for setting the source property: ElementSource and DataSource. If neither of these is used, the default value for source is null which signals the binding engine, upon creation, to get the value of the element's DataContext property and use the value as the source object.

When a creation means (e.g., creation means 402) specifies an ElementSource, the binding engine finds the element whose ID is specified by the ElementSource property. That element's DataContext is then used as the source object. Relative pathnames, such as /Parent/Parent and /Previous/Previous, may be used to specify the datasource. When the binding engine encounters /Parent, it looks for the element parent to the current element in terms of object hierarchy. For example, if the element is a customer order, specifying /Parent may signal the binding engine to look for the element which corresponds to a customer for the current order. Specifying /Parent is useful in nested repeater cases in which it is desirable to use values from an outer repeater in the scope of an inner repeater. Specifying /Previous signals the binding engine to look for the element previous to the current element under the Repeater. Specifying /Previous is useful when it is desirable to access the current-n item in addition to the current item, such as in line graphs and the like. Successive /Previous and /Parent may be used in accordance with the present invention.

In another embodiment, markup may specify a DataSource. When a DataSource is specified, the binding engine accepts the resource id of a Resource. If the Resource exposes a data property, then the binding engine will set the Source of the binding to the object returned by the data property of the DataSource resource. Otherwise, the binding engine will set the source of the binding to the resource object itself.

Those skilled in the art will appreciate that there are various ways in which properties 260-272 may be expressed using a markup language, and therefore, the manner in which each of these other properties may be expressed using a markup language is not explained in further detail herein.

The next three creation means 404-410 provide illustrative examples on the type of items that the present invention may bind. Creation means 404 illustrates support of binding to sub-properties and indexers. Creation means 404 corresponds to a binding written in C# as di.a.b[3].c, wherein di is the relevant data item. As long as the data item, the class that implements di.a, the class that implements di.a.b, and the class that implements di.a.b[3].c all support the notification mechanism of the present invention (e.g., IPropertyChange) and notify when their properties change, the binding specified using creation means 404 will cause the binding engine to automatically update the bound property (e.g., the target property) to reflect changes in the source data value.

Creation means 406 illustrates support of binding to a data collection. The binding engine will automatically use the current record of the collection at each level (wherein a, b, and c represent different levels). For example, if di.a has a type IDataCollection, the binding uses the current record of the collection to fetch the "b" property. Thus, the binding engine automatically updates values associated with a data collection whenever the current record is changed.

Creation means 408 illustrates support of binding to XML node. The path 260 to the value is supplied using an xpath expression, such as "/Customer/Order[@OrderID=10]/Amount)", as shown in FIG. 4. Creation means 410 illustrates support of binding to ADO data tables. For this implementation, the path 260 to the value is supplied as a field name for a particular row, such as "OrderID", as shown in FIG. 4.

Creation means 410 creates the bindings programmatically. The developer provides an objectref to the object that the binding should use as the source data item. The program statements shown in creation means 412 create a binding with the same behavior as the one illustrated by creation means 410. The SetBinding method has a number of more elaborate variants by which the programmer can specify any of the binding properties discussed above. The simple example above uses the button's DataContext as the source object. The following program statements create a one-way binding that uses a specific object (known at runtime) as the source:

Object source= . . . some arbitrary object . . . ;
Binding.SetBinding (myButton, Element.BackgroundProperty, "Color", BindType.OneWay, new ExplicitObjectRef(source));

The following example code displays one implementation for controlling a user interface property with data via the binding mechanism of the present invention. In this example, the data value (e.g., myInteger) and the UI property (e.g., TextContent) are activated as a binding. In addition, a transform (e.g., MyTranformer) is specified for this binding.

```
<Test TextContent=""*Data:Bind(Path=myInteger)"
Foreground=""*Data:Bind(Path=MyInteger;
Transformer=MyTransformer)"/>
public class MyTransformer : IDataTransformer
{
   public object Transform(object o, DynamicProperty dp,
   CultureInfo culture)
   {
      if ((int)o <0) return Red;
         else return Black;
   }
   public object InverseTransform(object o, PropertyInfo info, CultureInfo
                culture)
   {
      return null;
   }
}.
```

Thus, as described, the present invention provides a mechanism for associating a source data value with a target property in such a manner that changes in the coding of the user interface and the logic may be de-coupled. Thus, the present invention allows developers to easily modify and enhance the user interface without requiring them to modify the underlying logic of the application.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-readable storage medium having computer executable instructions when executed by a processor to perform a method for controlling user-interface properties with data, the method comprising:
   creating a binding in an application that comprises a user interface portion that includes user interface elements that each comprise one or more target properties and a logic portion that is configured to manipulate source data values; wherein the binding associates a target property that is associated with the user interface portion with a source data value;
   creating a binding object that is associated with the binding that comprises binding properties comprising: a path indicating a manner in which to locate the source data value, a binding type that defines a type of binding that comprises a one way binding type used to bind the source data value to a non-editable target property, a two way binding type used to bind the source data value to an editable target property; and update type that specifies when updates are to occur to the target property and a culture property that specifies a format to apply to the source data value, wherein based on the culture property, rules for transforming the source data value are specified; and
   upon receiving a notification that the source data value has undergone a change, automatically reflecting the change in the target property based on the binding, wherein the notification is received based on a selected binding type.

2. The computer-readable storage medium of claim 1, further comprising applying a transform to the source data value before reflecting the change in the target property.

3. The computer-readable storage medium of claim 1, wherein creating the binding includes programmatically specifying a binding type for the binding.

4. The computer-readable storage medium of claim 3, wherein the target property is updated based on the source data value when the binding is activated.

5. The computer-readable storage medium of claim 3, wherein the target property is updated when the source data value undergoes a change.

6. The computer-readable storage medium of claim 1, further comprising updating the source data value upon a target change to the target property.

7. The computer-readable storage medium of claim 6, wherein updating the source data value is performed asynchronously almost immediately after the target change.

8. The computer-readable storage medium of claim 6, wherein updating the source data value is performed asynchronously when focus on the target property is lost.

9. The computer-readable storage medium of claim 6, wherein updating the source data value is performed explicitly by an application.

10. The computer-readable storage medium of claim 1, wherein creating the binding is specified using code.

11. The computer-readable storage medium of claim 1, wherein creating the binding is specified using a markup language.

12. The computer-readable storage medium of claim 1, further comprising creating another binding that associates the target property with another source data value.

13. The computer-readable storage medium of claim 1, wherein the source data value is associated with a data source.

14. The computer-readable storage medium of claim 13, wherein the data source is specified through one of a XPath on XML, a column in ADO, and a reflection.

15. A computer system for controlling user interface properties with data, the computer system comprising:
   a processor; and
   a memory, the memory being allocated for a plurality of computer-executable instructions which are loaded into the memory for execution by the process, the computer-executable instructions performing a method comprising:
   creating a binding in an application that comprises a user interface portion that includes user interface elements that each comprise one or more target properties and a logic portion that is configured to manipulate source data values; wherein the binding associates a target property that is associated with the user interface portion with a source data value;
   creating a binding object that is associated with the binding that comprises binding properties comprising: a path indicating a manner in which to locate the source data value, a binding type that defines a type of binding that comprises a one way binding type used to bind the source data value to a non-editable target property, a two way binding type used to bind the source data value to an editable target property; and update type that specifies when updates are to occur to the target property and a culture property that specifies a format to apply to the source data value, wherein based on the culture property, rules for transforming the source data value are specified; and
   upon receiving a notification that the source data value has undergone a change, reflecting the change in the target property based on the binding, wherein the notification is received based on a selected binding type.

16. The computer system of claim 15, further comprising applying a transform to the source data value before reflecting the change in the target property.

17. The computer system of claim 15, wherein creating the binding includes programmatically specifying a binding type for the binding.

18. The computer system of claim 17, wherein the binding type includes a first binding type that results in the target property being updated based on the source data value when the binding is activated.

19. The computer system of claim 15, further comprising updating the source data value upon a target change to the target property.

20. The computer system of claim 19, wherein updating the source data value is performed asynchronously almost immediately after the target change.

21. The computer system of claim 19 wherein updating the source data value is performed asynchronously when focus on the target property is lost.

22. The computer system of claim 19, wherein updating the source data value is performed explicitly by an application.

23. The computer system of claim 15, wherein creating the binding is specified using code.

24. The computer system of claim 15, wherein creating the binding is specified using a markup language.

25. A computer-readable storage medium having computer executable instructions for controlling user-interface properties with data, the instructions comprising:
   a logic portion for manipulating a data value within an application;

a user interface portion within the application, the user interface portion being responsible for displaying a user interface property, the user interface portion being independent from the logic portion;

a binding that associates the user interface property with the data value; and at least one binding specification associated with the binding, the binding specification describing a relationship between the user interface property and the data value so that system level code is notified when the data value undergoes a change so that the system level code can direct the user interface portion to reflect the change in the user interface property; wherein the binding specification specifies binding properties comprising: a path indicating a manner in which to locate the source data value, a binding type that defines a type of binding that comprises a one way binding type used to bind the source data value to a non-editable target property, a two way binding type used to bind the source data value to an editable target property; and update type that specifies when updates are to occur to the target property and a culture property that specifies a format to apply to the source data value, wherein based on the culture property, rules for transforming the source data value are specified.

26. The computer-readable storage medium of claim 25, wherein the binding specification is specified using code.

27. The computer-readable storage medium of claim 25, wherein the binding specification is specified using a markup language.

28. The computer-readable storage medium of claim 25, wherein the binding specification identifies a source data item, a path to the data value in the source data item, a target user interface element, and the user interface property on the target user interface element.

29. The computer-readable storage medium of claim 28, wherein the binding specification further identifies a transform which is applied to the data value before reflecting the change in the user interface property.

30. The computer-readable storage medium of claim 28, wherein the binding specification further identifies a binding type for the binding.

31. The computer-readable storage medium of claim 30, wherein the user interface property is updated based on the data value when the binding is activated.

32. The computer-readable storage medium of claim 30, wherein the user interface property is updated when the data value undergoes the change.

33. The computer-readable storage medium of claim 28, wherein the binding specification further specifies that the data value be updated when the user interface property undergoes a UI change.

34. The computer-readable storage medium of claim 33, wherein the data value is updated asynchronously almost immediately after the UI change.

35. The computer-readable storage medium of claim 33, wherein the data value is updated asynchronously when focus on the user interface property is lost.

* * * * *